(12) United States Patent
Butler

(10) Patent No.: US 6,917,943 B2
(45) Date of Patent: Jul. 12, 2005

(54) SHEAF DATA MODEL

(75) Inventor: David M. Butler, Livermore, CA (US)

(73) Assignee: Limit Point Systems, Inc., Livermore, CA (US)

( * ) Notice: Subject to any disclaimer, the term of this patent is extended or adjusted under 35 U.S.C. 154(b) by 396 days.

(21) Appl. No.: 09/852,781

(22) Filed: May 11, 2001

(65) Prior Publication Data

US 2002/0095561 A1 Jul. 18, 2002

Related U.S. Application Data

(60) Provisional application No. 60/203,945, filed on May 12, 2000.

(51) Int. Cl.[7] ............................................... G06F 17/30
(52) U.S. Cl. ...................... 707/100; 707/101; 707/102; 707/103 R; 707/103 Z; 706/55; 703/2
(58) Field of Search ................................ 707/100, 101, 707/102, 103 R, 103 Z; 703/2; 706/55

(56) References Cited

U.S. PATENT DOCUMENTS

| | | | | |
|---|---|---|---|---|
| 6,175,836 B1 | * | 1/2001 | Aldred .................... | 707/103 R |
| 6,223,182 B1 | * | 4/2001 | Agarwal et al. ............ | 707/102 |
| 6,301,571 B1 | * | 10/2001 | Tatsuoka ..................... | 706/45 |
| 6,539,374 B2 | * | 3/2003 | Jung .............................. | 707/4 |
| 6,556,983 B1 | * | 4/2003 | Altschuler et al. ............ | 706/55 |

OTHER PUBLICATIONS

Oles, Frank, "An Application of Lattice Theory to Knowledge Representation", Theoretical Computer Science, vol. 249, No. 1, Oct. 24, 1996, pp. 1–36.*

Ait–Kaci et al, "Efficient Implementation of Lattice Operations", ACM Transaction on Programming languages and Systems, vol. 11, issue 1, Jan. 1989, pp. 115–146.*

Lengvarszky et al., "Covering in the Lattice of Subuniverses of a Finite Distributive Lattice", Journal of Australia Math Soc., Aug. 20, 1998, pp. 1–18.*

Jagadish, H, "The INCINERATE Data Model", ACM transaction on Database System, vol. 20, No. 1, Mar. 1995.*

* cited by examiner

Primary Examiner—Luke S Wassum
Assistant Examiner—Khanh Pham
(74) Attorney, Agent, or Firm—Oblon, Spivak, McClelland, Maier & Neustadt, P.C.

(57) ABSTRACT

A data model including a first table to represent an entity type with a column in the table for a respective attribute of the entity type, and having rows entered with attribute data. The data model also includes a row graph which represents an ordering relationship between the rows of the first table, and a column graph which represents an ordering relationship between columns of the first table. Further, the column graph is a row graph from a second table.

88 Claims, 9 Drawing Sheets

14

EMPLOYEE (16, 18, 20, 22)

| ID | NAME | TITLE | SALARY |
|---|---|---|---|
| 1 | John Jones | Programmer | $100,000 |
| 2 | Mary Smith | President | $120,000 |
| 3 | Michael Brown | Programmer | $80,000 |
| 4 | Linda Green | Secretary | $50,000 |

MANAGED_BY (16, 26)

| WORKER | MANAGER |
|---|---|
| 1 | 2 |
| 3 | 2 |
| 4 | 2 |

Figure 2b 28 (16, 18, 20, 22)

| ID | NAME | TITLE | SALARY |
|---|---|---|---|
| 1 | John Jones | Programmer | $100,000 |
| 2 | Mary Smith | President | $120,000 |

| 16 | 18 | 20 | 22 |
|---|---|---|---|
| EMPLOYEE ||||
| ID | NAME | TITLE | SALARY |
| 1 | John Jones | Programmer | $100,000 |
| 3 | Michael Brown | Programmer | $80,000 |

| NAME |
|---|
| John Jones |
| Mary Smith |
| Michael Brown |
| Linda Green |

| ID | NAME | TITLE | SALARY |
|---|---|---|---|
| 1 | John Jones | Programmer | $100,000 |
| 2 | Mary Smith | President | $120,000 |
| 3 | Michael Brown | Programmer | $80,000 |

| ID | NAME | TITLE | SALARY |
|---|---|---|---|
| 1 | John Jones | Programmer | $100,000 |

Figure 2g

SHEAF DATA MODEL

This application claims priority of provisional application Ser. No. 60/203,945 Filed May 12, 2000

STATEMENT REGARDING FEDERALLY SPONSORED RESEARCH

The present invention was made in part with U.S. Government support as a subcontractor with Lawrence Livermore National Lab (LLNL) under contract to DOE. The LLNL contract number is "Prime Contract No. W-7405 ENG 48" and the subcontractor contract number is B347785. The U.S. Government has certain rights in the invention.

BACKGROUND OF THE INVENTION

1. Field of the Invention

The present invention relates to a data model and associated operators. More particularly, the present invention relates to a sheaf data model including a base set and a corresponding graph representing the inclusions of the base set, and associated operators which operate on the sheaf data model.

2. Discussion of the Background

A data model is a theory for describing computer data. The term was introduced by C. F. Codd in the early 1970's to describe the relationship between previous approaches to data management and a relational data model which he had just introduced. Formally, a data model specifies three things: 1) a class of mathematical objects which are used to model data; 2) the operations on those objects; and 3) the constraints between the objects that must be satisfied in a valid database.

The purpose of a data model is to serve as a basis for analysis, design, and implementation of database management systems (DBMS). That is, a DBMS will implement in software (or sometimes in hardware) the operations of the model which allow clients of the system to store and manipulate their data as instances of the objects of the model.

Currently all major DBMS', such as the ones sold under the trademarks ORACLE, INFORMIX and SYBASE, are based on some form of the relational model. To the commercial data management industry, data management is essentially indistinguishable from relational database management system (RDBMS) technology.

In the relational data model, the mathematical objects are relations on domains and the operations are given by relational algebra. The terms relation, domain and relational algebra have detailed, rigorous definitions in mathematics. However, it is possible to understand these terms via a widely used table analogy, and which will be described with reference to the tables shown in FIGS. 1a–1c and 2a–2g.

A mathematical set is any collection of objects, entities, etc. A domain is a set of values that can be directly represented on the computer, in other words a computer data type. Three very common domains are integer numbers, real numbers, and character strings. Referring to FIG. 1a, a domain 7 is a table 8 with a single column 17 listing all possible values 9 in the domain 7. A name 11 of the domain 7 is a column heading. The number of values in the domain 7 has been selected to be very small to make the table easy to draw, however, in practice the number of values is much larger.

FIG. 1b illustrates a table 10 representing a binary Cartesian product of two sets A and B. The table 10 includes all possible pairs (a,b), where a is a member of set A and b is a member of set B. As shown, the table 10 includes two columns 13 and 15, one for set A and one for set B. FIG. 1b shows the Cartesian product of the domain TINY_INT with itself. Each row in the table 10 includes a pair of values and hence corresponds to a member of the Cartesian product set. Each column 13, 15 corresponds to one of the factors in the product.

In addition, the Cartesian product can be extended to more than just two factors. The n-ary Cartesian product A×B×C× . . . (n factor sets) is a table with n columns, one for each factor. Each row contains n values, one from each one of the factors. In addition, there is a row in the table for each possible combination of values. Each row is called an n-tuple and the n-ary Cartesian product is the set of all such n-tuples.

FIG. 1c illustrates a table 12, which is subset of a Cartesian product set shown in table 10 (see FIG. 1b). Table 12 is a relation and includes the same column headings as table 10. However, table 12 includes only some of the rows of table 10. Thus, table 12 is referred to as a relation, because a subset is selected to represent all the pairs satisfying a predetermined relationship between the two columns 13 and 15. In more detail, FIG. 1c illustrates the relation LESS-THAN-OR-EQUAL in which the value in column 13 of a given row is less than or equal to the value in column 15 of the same row.

A relation schema or relation type is a list of column headings for the table or equivalently a list of factors in the Cartesian product which the relation is a subset of. There are many different possible subsets of the rows of a given Cartesian product set and hence there are many possible relations for a given relation type. The term "relation instance" is used to refer to a specific subset of the rows of a given relation type.

Applications are often analyzed for data base purposes using the dual notions of entity and relationship. An entity is any thing or object in the real world which is distinguishable from all other objects. Entities have attributes. An attribute is a named property that takes its value from some domain. An entity is represented by its set of attribute values and the attribute values identify the entity and describe its state. A relationship is an association between entities.

When the relational model is used to store application data, the application data is typically organized so that a relation represents either an entity in the application or a relationship between entities. FIGS. 2a–2g illustrate an example of a relational model directed to a personnel application including an EMPLOYEE table 14 and a MANAGED_BY table 24 (see FIGS. 2a and 2b). The EMPLOYEE table 14 shown in FIG. 2a is an entity table. Each row in table 14 represents an entity (i.e., an employee) and the columns in table 14 represent attributes of the entity (i.e., an employee_id 16, name 18, job title 20, and salary 22).

The MANAGED_BY table 24 shown in FIG. 2b is a relation corresponding to a relationship between workers and managers. That is, each row in table 24 represents a relationship between two employees, one a manager of the other. The columns in table 24 include the ids 16 of the relevant employees and a manager_id 26.

In addition, because an entity is any thing or object, an attribute value can also be considered as an entity. For example, a name serving as an attribute value of an entity EMPLOYEE may also be considered an entity. Thus, an entity-attribute association can be considered as a relationship between two entities, a primary entity and the attribute entity. This fundamental relationship is referred to as a HAS_A relationship, which is built into the relational data model. That is, the HAS_A relationship is directly represented by the relationship between a table and its columns. Other relationships, such as the MANAGED_BY relationship shown in FIG. 2b, must be represented by additional tables.

Further, a large number of operations may be performed on relations. The operations receive one or more relations (i.e., tables) as an input and produce a relation as an output. The operations are not all independent of each other. That is, some operations can be implemented using other operations. Six fundamental operators in the relational algebra include: 1) Cartesian product, 2) selection, 3) projection, 4) union, 5) intersection, and 6) rename. The Cartesian product operator has been discussed with reference to FIG. 1b. A description of the other five operators will now be given with reference to FIGS. 2c–2f.

The selection operator receives a table (i.e., a relation) and a row selection condition as an input and outputs a table containing only the rows that match the selection condition. For example, the command "SELECT rows with SALARY>=$100,000 in relation EMPLOYEE" returns a table 28 shown in FIG. 2c. Note the table 28 in FIG. 2c does not have a name. The rename operator (discussed below) allows a table to be named. However, in some instances the table produced by an operator is a temporary result to be used only as input to another operator. In these instances there is no need for the table to have a name.

Another result of a selection operation is shown in FIG. 2d, in which the command "SELECT rows with TITLE= Programmer in relation EMPLOYEE" is executed. As shown, the resulting table 30 includes only the rows with the title "Programmer."

The projection operator is similar to the selection operator, except it works on columns. That is, the projection operator receives a table and a column selection condition, typically a list of column names as an input and outputs a table including only the selected columns. In addition, because two rows may have a different attribute only in a column not selected by the projection operation, the resulting table may include duplicate rows. In this instance, only one of the duplicate rows is retained, and the others are discarded. FIG. 2e illustrates a result of the projection operation, in which the command "PROJECT columns named NAME in relation EMPLOYEE" is executed. As shown, the projection operation produces a table 32 including all of the employees' names.

The union operator receives two tables as an input and outputs a table including all the rows in either of the input tables. In addition, the union operator can only be used on tables which both have the same relation type (column headings). For example, FIG. 2f illustrates a resultant table 34 from a union operator of the tables shown in FIGS. 2c and 2d. The table 34 is produced by executing the command "UNION relation Table 6 with relation Table 7." The references to Tables 6 and 7 respectively refer to the tables shown in FIGS. 2c and 2d.

The intersection operator receives two tables as an input and outputs a table containing all rows that were the same in both tables. Similar to the union operator, the intersection operator can be only used on tables which both have the same relation type. For example, FIG. 2g illustrates a resultant table 36 from an intersection operation of the tables shown in FIGS. 2c and 2d, in which the command "INTERSECT relation Table 6 with relation to Table 7" is executed.

The above-noted operators all produce nameless tables. However, a table must have a name if it is to be later referred to. The rename operator may be executed to perform this function.

The set of operators described above is a primitive set of operators. That is, the set is a minimal set of operations from which other more convenient operations can be built. Practical relational database systems implement a number of other operators, which for simplicity purposes are not described herein.

A database for a particular application is designed by choosing a set of relation types that represent the entities and relationships in the application. This collection of relation types is called the database schema. The details of the mathematics of the relation model place a number of constraints on the relation types in the database schema. A database schema that satisfies these constraints is said to be in normal form and the process of reshaping a candidate database schema design to meet the requirements of the normal form is called normalization. The net effect of normalization is typically to scatter the attributes of an entity across many different tables.

The constraints of the normal form are organized into various stages, such as first normal form, second normal form, etc. The first normal form requires each column in a table to contain atomic data. That is, the domain associated with the column must be some predefined, preferably fixed size type value such as an integer. The reason for this is because the relational operations deal only with the table structure and can not deal with any internal structure associated with the data within a given cell in the table.

The most infamous type of non-atomic data is the array. Frequently, the most natural interpretation of the application entity is it has an attribute which is a variable length collection. For instance, an attribute for an employee might be "skills," a variable length array of skill keywords. However, this attribute would constitute a non-atomic attribute and hence is forbidden. Typically, the atomic attribute requirement forces the creation of additional tables, such as an EMPLOYEE_SKILLS table, which would cross-reference other employee entities to skill entities. In many applications this is an entirely acceptable approach. However, in several instances (discussed below) this type of processing is unacceptable.

The relational data model was a radical departure from previous data management approaches because it is a mathematical model. Previous ad hoc approaches had mostly focused on how data was to be stored and described how to access the data in terms of how it was stored. This limited the types of queries that could be made and generated massive software maintenance problems whenever the data storage was reorganized.

The relational data model instead described data in terms of abstract mathematical objects and operations. The mathematical abstraction separated how data was accessed from how it was actually stored. Furthermore, the mathematics ensured that the relational algebra was a complete set of query operators. That is, any query within the universe of possible queries defined by the model could be generated by a suitable combination of the fundamental relational algebra operators.

The mathematical abstraction and completeness of the relational algebra meant that sophisticated query processors could be implemented as independent subsystems, without knowledge of the application. This arguably created the database management system as a commercial product and unquestionably revolutionized the database industry.

In spite of the overwhelming success of the relational data model, not all application areas are well served by the model. A first application which is not well suited for the relational model is an application which deals with spatial data. There are a wide variety of applications using data that is spatial or geometric in nature. For example, computer aided design and manufacturing (CAD/CAM) and geographic information systems (GIS) are two well known commercially important examples.

A main focus of systems that deal with spatial data is the need to represent spatial decomposition. For example, in design data, the decomposition into systems, subsystems, and parts is a spatial decomposition. Similarly, in geographical data, the decomposition into states, counties, and cities is a spatial decomposition. Furthermore, these applications frequently exhibit multiple, concurrent decompositions. For instance, geographic systems must represent both physical boundaries and political boundaries.

At the finest level of decomposition, spatial data includes collections of geometric primitives and the topological relationships between the primitives. Geometric primitives include simple geometric shapes like points, lines and polygons, as well as a wide and constantly growing number of mathematically more sophisticated primitives, such as non-uniform-rational-B-splines n (NURBS). The topological relationships describe how these geometric patches are connected to form complex structures.

It has long been understood that the relational model is a poor choice for representing spatial data. There are at least two fundamental issues. First, it is difficult to represent the decomposition relationships, especially the topological relationships, in a natural and efficient way. For instance, a polygon has a collection of edges (i.e., a HAS_A relationship) which is naturally represented as an attribute of the polygon entity. However, the first normal form prohibits such variable length collections as attributes. On the other hand, representing the topological relationships in separate relationship tables requires complex, possibly recursive, and frequently inefficient queries to retrieve all the parts of a geometric primitive. Second, the operations of the relational algebra are not well suited to natural spatial queries, such as nearness queries and region queries.

A second application which is not well suited for the relational model is object-oriented programming systems. Object-oriented languages, such as Smalltalk, C++ and Java, facilitate the definition of programmer-defined entity types called classes. Individual entities of these entity types are called objects. Complex entities and entity types are composed primarily using two relationships. First, the HAS_A relationship is used to compose simpler objects into more complex objects. That is, objects have parts which are other objects. An IS_A relationship is used to combine entity types into more complex types.

The IS_A relationship, or inheritance as it is called in the object-oriented paradigm, is a powerful new technique introduced by the object-oriented paradigm. The IS_A relationship is a relationship between entity types, rather than just individual entities. If an entity type MANAGER is specified to inherit type EMPLOYEE, then the MANAGER type is a special type of EMPLOYEE (i.e., a IS_A relationship). Every MANAGER entity has all the attributes every EMPLOYEE entity has, plus any attributes that are specified in type MANAGER. This programming mechanism greatly facilitates the construction of complex software applications by making it much less labor intensive and less error prone to model the natural inheritance relationships found in applications.

In execution, an object-oriented application is a complex network of objects related by the HAS_A and IS_A relationships. The natural notion of data storage for such a system is the notion of object persistence. That is, it should be easy to store an object and all the objects it refers to in a database, thus making the object persist after the program that created it has finished execution. Similarly, it should be easy to retrieve the object when execution resumes.

Attempts to use the relational model to store object-oriented data suffer one of the same difficulties as described above for spatial data, which is complex, recursive HAS_A relationships are difficult to implement in the relational model. A more severe problem is the IS_A relationship can not at all be implemented directly in the relational model. In the context of a relational data base, the IS_A relationship is a relationship between relation types. As discussed above, a relation type is not a relation, but is a set of attributes. Thus, the relation types as such can not be represented or operated on within the model.

A third application area for which the relational model is not well suited, and an increasingly commercially important one, is numerical simulation or scientific computing. Simulation software is aimed at predicting the outcome of complex physical, biological, financial, or other processes by building mathematical models and numerically solving the resulting equations. Defense, petroleum exploration, and medical imaging have been the classical applications for scientific computing. However, as the price of numerical computation has dropped, it is increasingly cost effective to use simulation in a wide range of applications. For example, the manufacturing industry is replacing the conventional design-build-test-redesign product development cycle with a design-simulate-redesign cycle. Similarly, financial trading is directed by market simulations and major metropolitan TV stations produce their own weather simulations, complete with computer generated animations.

Simulations combine features of spatial data and object-oriented data. The results of the simulation usually represent the dependence of some property on space or time. For example, the result may represent the dependence of mechanical stress on position within the product, or a stock price on time, or a temperature on location. Thus, simulation data usually contains embedded spatial data representing the shape of the product, the interesting intervals of time, or the geography of the region of interest. In addition, the space and time dependent properties computed are usually complex mathematical types with important IS_A relationships between them.

In addition to sharing these features with spatial data and object-oriented data, simulation data has another essential feature which is the data sets tend to be very large. The amount of data that must be processed in a simulation is directly proportional to the desired accuracy. The quest for accuracy always requires that the simulations be run at or over the limits of the computational resource.

SUMMARY OF THE INVENTION

Accordingly, one object of the present invention is to solve the above-noted and other problems.

Another object of the present invention is to provide a novel data model which efficiently deals with spatial data, object-oriented programming applications and simulation applications.

Another object of the present invention is to provide novel algebraic operators which operate on the data model according to the present invention.

To achieve these and other objects, the present invention provides a novel method of representing data on a computer, including the steps of constructing a first table to represent an entity type with a column in the table for a respective attribute of the entity type, and entering attribute data into rows of the first table. The method also includes the steps of constructing a row graph which represents an ordering relationship between the rows of the first table, and assigning a column graph which represents an ordering relationship between columns of the first table. The column graph is a row graph from a second table.

The present invention also provides a novel data model including a first table to represent an entity type having a column in the table for a respective attribute of the entity type, and having rows entered with attribute data, and a row graph which represents an ordering relationship between the rows of the first table. Further, the data model includes a column graph which represents an ordering relationship between columns of the first table; in which the column graph is a row graph from a second table.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2a illustrates an example of a relational model directed to a personal application including employees;

FIG. 2b illustrates an example of a relational model corresponding to a relationship between workers and managers;

FIG. 2c illustrates a resulting table formed by executing a selection operator in the relational data model;

FIG. 2d illustrates another resulting table produced by executing the selection operation in the relational data model;

FIG. 2e illustrates a resulting table produced by executing a projection operator in the relational data model;

FIG. 2f illustrates a resulting table produced by executing a union operator in the relational data model;

FIG. 2g illustrates a resulting table produced by executing an intersection operator in the relational data model;

FIG. 4c illustrates a finite distributive lattice corresponding to the partially ordered set shown in FIG. 4a;

DESCRIPTION OF THE PREFERRED EMBODIMENTS

The above-noted problems associated with the relational model (i.e., using the relational model to represent spatial, object-oriented and scientific data) all originate because the relational model provides no explicit mechanism for representing inclusion. Two distinct types of inclusion are:

1) row inclusion: HAS_A relationships correspond to row inclusion (e.g., the decomposition relationships of spatial data and the object containment relationships of object-oriented data). For example, an edge entity, represented by a row, is conceptually included in a polygon entity represented by another row; and 2) column inclusion: IS_A relationships correspond to column inclusion (e.g., the inheritance relationship of object-oriented data). If type MANAGER inherits type EMPLOYEE, then a MANAGER table includes all the column headings of an EMPLOYEE table.

The theory of partially ordered sets may be used to address inclusion. A partially ordered set, or poset as it is frequently abbreviated, includes two components: 1) a set of objects, called the base set; and 2) a reflexive, antisymmetric, transitive relation on the base set, called the ordering relation. The ordering relation explicitly defines which members of the base set are included in each other.

The table analogy discussed above with reference to the relational mode can also be used to describe a partially ordered set. In this instance, a poset includes a table and a directed, acyclic graph. The table represents the base set and the graph represents the ordering relation.

Figures 1A, 1B, 1C:
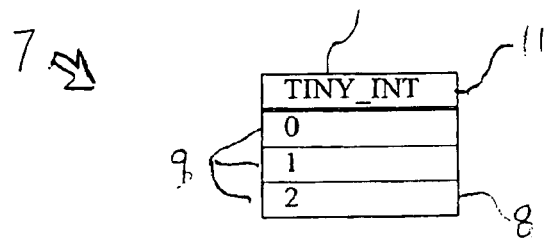
FIG. 1a illustrates an example of a domain of the relational data model.
FIG. 1b illustrates a binary Cartesian product of two sets A and B in the relational data model.
FIG. 1c illustrates a table which is a subset of the Cartesian product shown in FIG. 1b.
Figure 3:
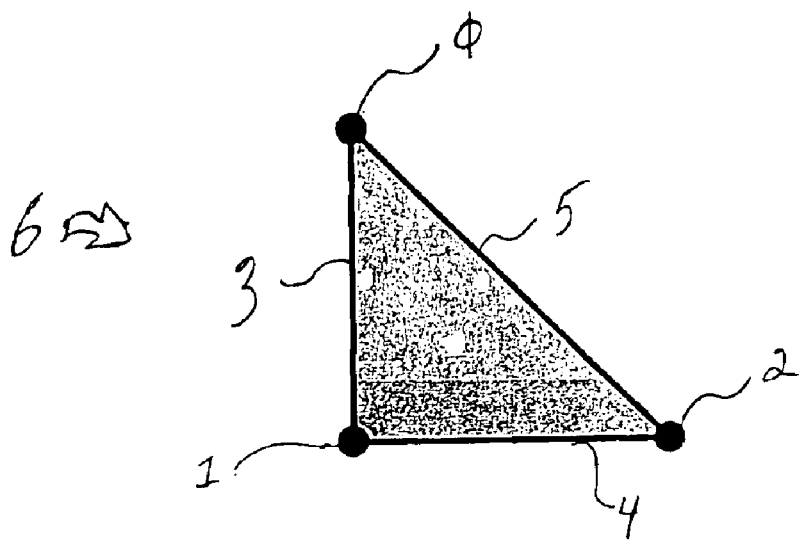
FIG. 3 illustrates a simple spatial object.

For example, FIG. 3 illustrates a very simple spatial object comprising a single triangle 6 including three vertices 0, 1, 2; three edges 3, 4, 5 and the interior space of the triangle 6.

Figure 4A:
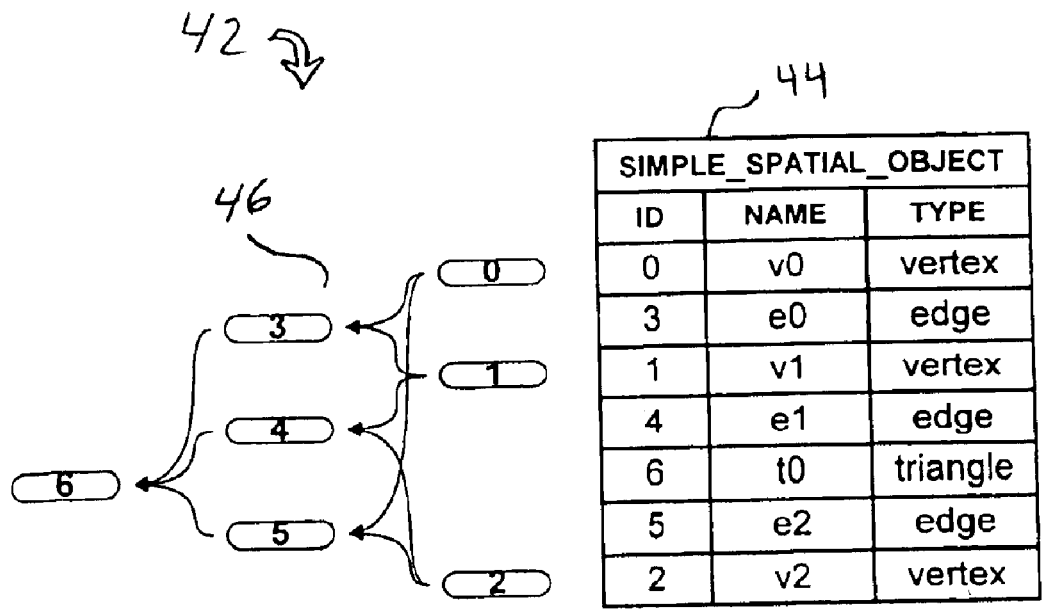
FIG. 4a illustrates a partially ordered set including a table and corresponding graph of the simple spatial object shown in FIG. 3 according to the present invention.

FIG. 4a shows a table analogy 42 of a poset corresponding to spatial object shown in FIG. 3. The table analogy 42 includes a base set 44 having one row for each of the entities in the triangle (e.g., the three vertices 0, 1, 2; the three edges 3, 4, 5; and the interior space). The table analogy 42 also includes a graph 46, which represents the ordering relation (i.e., the inclusion relationships). Each "node" in the graph is labeled with the ID of the entity it represents and there is a "link" from each node to the node representing the next most inclusive entity (note that the links are directional.) An entity is included in another entity if there is a path in the graph 46 from the node corresponding to the first entity to the node corresponding to the second entity. For example, referring to the graph 46, the vertex v0 (ID=0) is included in the triangle t0 (ID=6) because there is a link from node 0 to node 3 and a link from node 3 to node 6.

If an entity A is "next most inclusive" to entity B, there is no entity between A and B (i.e., there is no entity C between A and B). Thus, for any given entity, there may be more than one next most inclusive entity. For example, both edges e0 (ID=3) and edge e2 (ID=5) are "next most inclusive" to vertex v0. Thus, the meaning of the term "partial order" is that the members of the base set are ordered with respect to each other, but not totally ordered so that every member has exactly one "next larger" member. In a partial order, a member can have one next larger member, many next larger members, or no next larger members. The definition of a partially ordered set also includes the case in which every member of the base set has no next larger members. This corresponds to the ordinary, unordered set.

In addition, the ordering relation of a partially ordered set is often referred to by the phrase "less than or equal to." For example, in FIG. 4a, one can say $v0 \leq e0$, which means $v0$ is included in $e0$. The "next most inclusive" relation is often referred to as the "covers" relation and the graph is often called a "Hasse diagram."

All the operators of the relational algebra may be configured to work on posets. The effect of any of the operators on the table part of a poset is the same as in the relational case, but each operator must be configured to also operate on the graph part (discussed in more detail later).

Figure 4B:
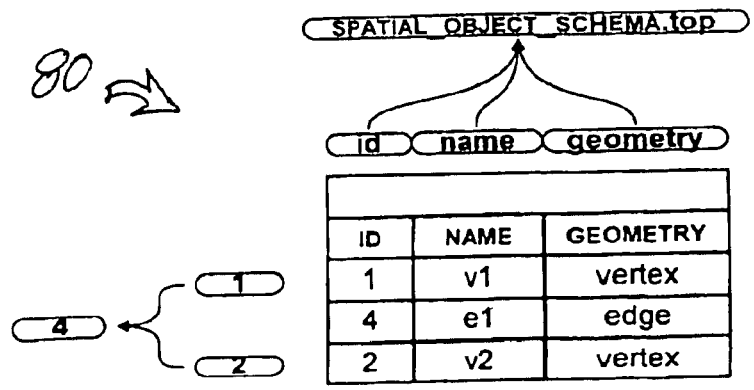
FIG. 4b illustrates a resultant poset after executing a Down operator.

In addition to the relational algebra operators, there are a number of other poset operators that are derived from the order relation. Two poset operators will now be described in which it is assumed $a_1, a_2$, etc., are rows in a poset table A:

1) $a_1 \leq a_2$, if and only if there is a path in the graph from the node representing $a_1$ to the node representing $a_2$. This is a poset query command in which a value corresponding to TRUE or FALSE will be returned. That is, if $a_1$ is less than or equal to $a_2$ as defined, a TRUE value will be returned. 2) Down(a) is another poset operator which returns a poset that contains all the members of A that are less than or equal to "a". The result is called the down set of "a". For example, FIG. 4b illustrates a resultant poset 80 after the command "Down(4)" is executed (member with id=4) for the simple spatial object shown in FIGS. 3 and 4a. As shown, this command returns the IDs 4,1 and 2 which correspond to the edge e1 and vertices V1 and V2. Thus, by executing the Down(a) operator, it is possible to determine all the members of the poset A which are less than or equal to "a."

The name "down set" originates in the standard mathematical practice of drawing links so they point up. Thus if $a1 \leq a2$, then $a1$ is below $a2$ in the graph; smaller members are always below larger members. In such a vertical graph, the down operator literally goes down the graph, hence the name. To be visually consistent with the rows in the table, the links in the graphs shown in the figures according to the present invention point from right to left (and not in a downward manner).

The operators thus defined operate on entities specifically appearing in the table. In applications in which inclusion plays an important role, it is often important to treat a collection of entities as if it was an entity itself, a sort of "virtual" row in the table. For instance, in spatial applications, it is often important to deal with the boundary of an object. The boundary of the simple spatial object (i.e., triangle 6) shown in FIG. 3 is a collection of three edges, but it is often desirable to treat it as a single entity, the boundary.

Figure 4C:
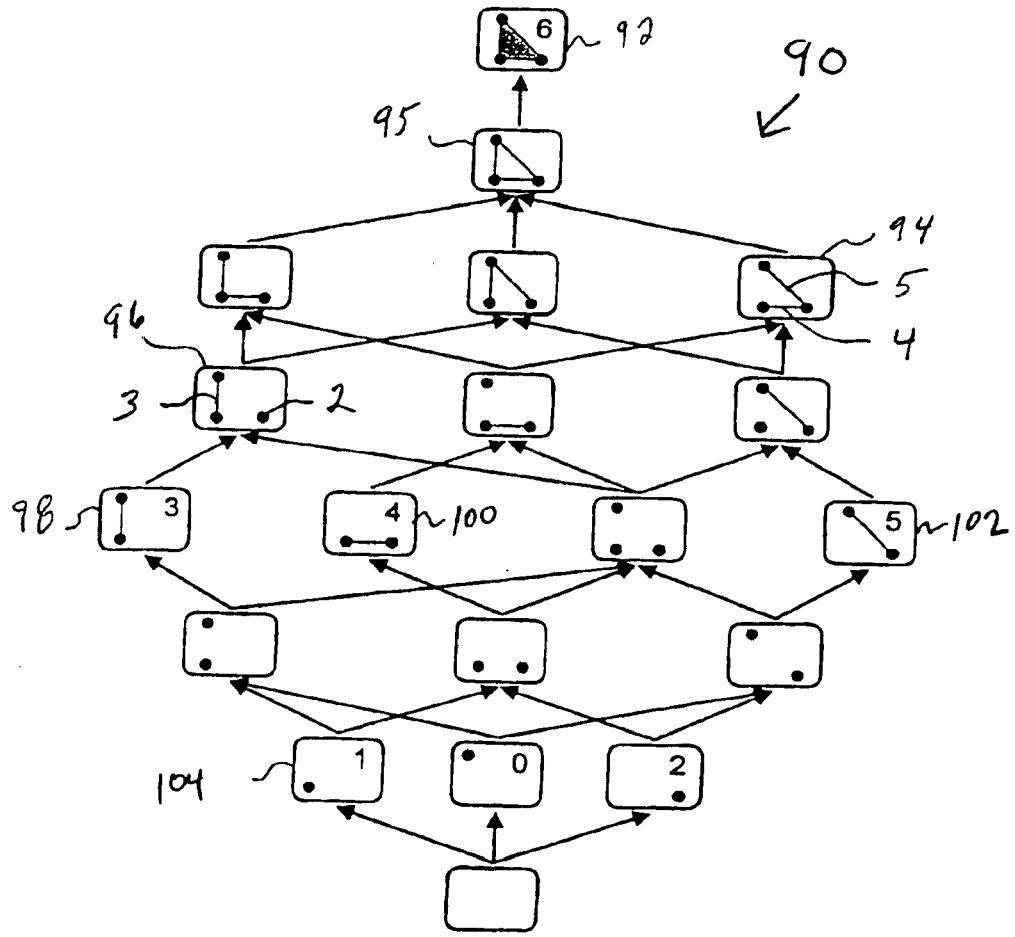

Lattice theory may be used to accomplish this. In more detail, associated with every finite poset is another poset, a special type of poset called a finite distributive lattice (henceforth "FDL" or just "lattice"). FIG. 4c shows the FDL 90 for the simple spatial object shown in FIGS. 3 and 4a. The number of members of an FDL is typically much greater than the number of members of the poset that generates it. For simplicity and readability, the graph is drawn in the traditional mathematical orientation (i.e., in a downward fashion). Icons also show the geometrical meaning of each member of the lattice, instead of ID attributes as used in previous figures.

For example, icon 92 illustrates the complete triangle 6 including all members of the poset. Icon 94 includes member IDs 4 and 5 which correspond to edges e1 and e2, respectively. Icon 96 includes member IDs 2 and 3 which correspond to edge e0 and vertex V2. Any icon below and connected to icon 96 is included in icon 96.

Intuitively, the lattice contains all the members of the original poset plus all distinct combinations of them. Two different combinations of members are distinct if they do not represent the same inclusion. For instance, the combination of just edges e0 and e1 is distinct from the combination of edges e0, e1, and e2, since the former combination does not include all the points in edge e2. Conversely, the combination of the three edges is not distinct from the combination of the three edges and the three vertices. These two combinations (edges and edges+vertices) are equivalent because the vertices are already included in the edges; adding them to the combination doesn't include any additional points. Consequently, the lattice in FIG. 4c contains a single member for the boundary (i.e., icon 95), it does not contain separate members for the collection of three edges and for the collection containing three edges and three vertices. The lattice is not the set of all subsets of rows of the table. Thus, the lattice generated by a poset is a poset itself and can be thought of using the table analogy similar to that shown in FIG. 4a, for example. The lattices' table contains all distinct combinations of rows of the original poset and its graph contains all the inclusion relations.

In addition, in a lattice there are two additional operations defined. In the following operators, $l_1, l_2, \ldots 1_n$ are members of a lattice L. A first operator according to the present invention is the Join operator. In more detail, the operator $Join(l_1, l_2, \ldots, l_n)$ returns the smallest member of L which is greater than or equal to all of its inputs. For example, referring to FIG. 4c, the Join of ID's 3, 4, and 5 respectively shown in icons 98, 100 and 102, results in the boundary of the triangle shown in icon 95. A second operator $Meet(l_1, l_2, \ldots, l_n)$ returns the largest member of L which is less than or equal to all of its inputs. For example, the Meet of ID's 3, 4 respectively shown in icons 98 and 100 results in the vertex v1 shown in icon 104.

Now to incorporate column inclusion into the model. To do this, the table analogy is expanded so that there are two graphs associated with the table. That is, a first graph as shown in FIG. 4a (hereinafter referred to as the row graph), and a new graph (hereinafter referred to as the column graph). The column graph describes the inclusion structure of the columns.

In the sheaf data model, every lattice has an associated lattice, which is referred to as a schema. The column graph of a lattice is defined by the row graph of its schema. The schema relationship is recursive: a schema lattice has to have a schema lattice. This recursion is terminated in a special lattice, the primitive schema lattice, which is its own schema.

Figure 5:
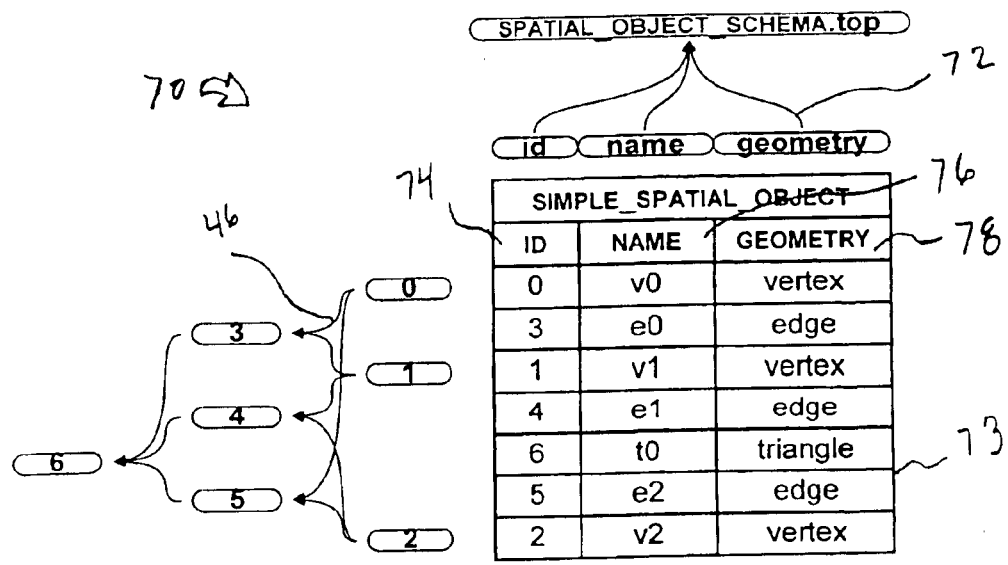
FIG. 5 illustrates a simple spatial object lattice corresponding to the simple spatial object shown in FIG. 3.
Figure 6:
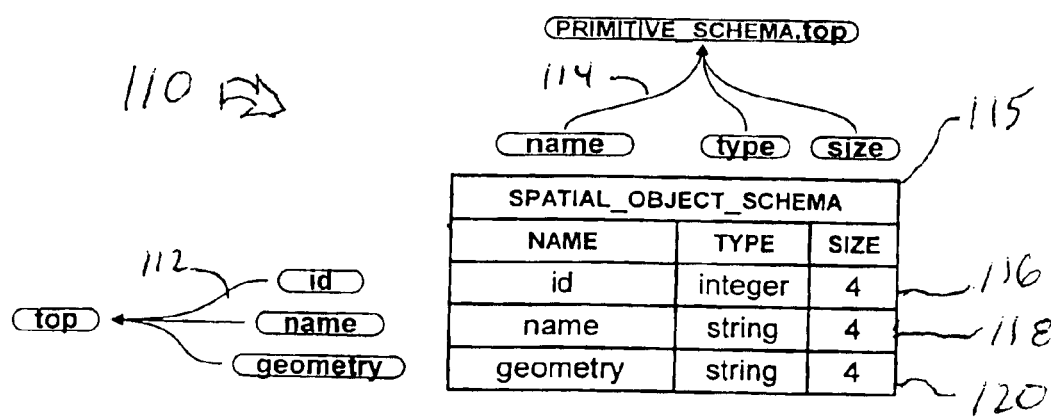
FIG. 6 illustrates a schema lattice corresponding to the simple spatial object lattice shown in FIG. 5.

The lattice of the triangle 6 shown in FIG. 3 and its corresponding schema lattice are shown in FIGS. 5 and 6, respectively. FIG. 5 illustrates the lattice 70 including a row graph 46, column graph 72 and table 73. The table 73 includes columns 74, 76 and 78 respectively corresponding to an ID, NAME AND GEOMETRY of the entity type. FIG. 6 illustrates the corresponding schema lattice 110. The schema lattice 110 includes a row graph 112, column graph 114, and table 115. The table 115 includes rows 116, 118 and 120 respectively corresponding to the columns 74, 76 and 78 of the lattice 70 shown in FIG. 5.

Thus, using the schema lattice 110, it is possible to determine the variable type of the primary entities in the rows of the table 73. For example, referring to table 73 (FIG. 5), ID number 3 corresponds to edge e0 of the triangle 6 shown in FIG. 3. Referring to the schema lattice 110 (FIG. 6), it is possible to determine the ID number 3 is an integer type with a size of 4 bytes. Similarly, the name "e0" is a string type with a size of 4 bytes and the geometry "edge" is also a string type with a size of 4 bytes.

The association between a lattice and its schema introduces three more operators. An exponentiation operator EXP(L) returns a lattice with schema L. The table and row graph of the result are empty. A logarithm operator LOG(L) returns the schema lattice associated with lattice L. A restriction operator RESTRICT L TO s, where s is a member of the schema of L, returns the projection of L onto the columns in the down set of s.

Turning now to sheaves. The table of a lattice L is the Cartesian product of the rows of the schema lattice, where each row is interpreted as a domain. By using RESTRICT L TO s successively for each member s of the schema lattice we can define a family of tables, one for each member of the schema. Each member of this family is itself a Cartesian product over a subset of the rows of the schema lattice.

An association, or map, generated in this manner between a lattice and a family of Cartesian product sets is called a sheaf. The schema lattice is referred to as the source of the sheaf and the family of product sets is referred to as the target of the sheaf. The largest member of the target, the table which is restricted to produce all the other members of the target, is called the top table.

The row graph of the top table is not defined by the schema. It can be arbitrarily chosen by the user. Once the row graph is defined, the top table defines an FDL and can itself be used as the schema for another lattice.

Hence, every lattice defines a sheaf of Cartesian product sets (tables) and this sheaf can be viewed as the primary object of the data model. The table, row graph, and column graph, as well as the relational, poset, lattice, and sheaf operators can all be considered different aspects of the sheaf object. This is the origin of the name sheaf data model.

The sheaf structure and operators introduce column inclusion into the data model, but they also add an additional, critical feature which is a data dependent schema. The schema of a table is defined by the contents of another table, not predefined to some fixed set of columns. This feature is essential for representing simulation data.

As discussed above, all the operators of the relational algebra can be generalized to work on either an FDL or a sheaf. The typical effect of any of the operators on the table part of an FDL or sheaf is the same as in the relational case, but for an FDL each operator must be configured to also operate on the row graph, while for a sheaf each operator must be configured to also operate on both the row graph and the column graph. The appropriate configuration for each of the six basic relational operators is discussed below.

1) The Cartesian product operator. For the FDL configuration, the table of the result of the Cartesian product A×B, where A and B are both FDLs, is the same as for the relational configuration.

The row graph is arbitrary and may be chosen to be any order relation the user desires. However, there are two common and important choices. Let $(a_1, b_1)$ and $(a_2, b_2)$ be two rows in the product table:

product order: $(a_1, b_1) \leq (a_2, b_2)$ precisely when $a_1 \leq a_2$ and $b_1 \leq b_2$ lexicographic order: $(a_1, b_1) \leq (a_2, b_2)$ precisely when $a_1 = a_2$ and $b_1 \leq b_2$ The choice of order must be provided as a parameter to the operator.

For the sheaf configuration, the table and the row graph of the result of A×B, where A and B are sheaves, is the same as the FDL configuration. The column graph (schema) of the result is the disjoint union of the column graphs of A and B.

2) The selection operator. For the FDL configuration, the table of the result is the same as for the relational operator. The row graph is a graph which satisfies the row selection condition, specified as follows: let g0 be the reflexive, transitive closure of the row graph of the input and let the g1 be the subgraph of g0 containing the nodes corresponding to the set of rows which satisfy the selection condition and all the links which reference only nodes corresponding to the selected set. The graph which satisfies the row selection condition is the reflexive, transitive reduction of g1.

For the sheaf configuration, the table and the row graph of the result is the same as the FDL configuration. The column graph of the result is the same as the column graph of the input.

3) The projection operator. For the FDL configuration, the table of the result is the same as for the relational operator, except duplicate rows are not discarded. The row graph of the result is the same as the row graph of the input.

For the sheaf configuration, the table and the row graph of the result is the same as the FDL configuration. The column graph of the result is a graph which satisfies the column selection condition, specified as follows: a graph satisfies the column selection condition if and only if it is the graph formed as the result of the selection operator with a row selection condition corresponding to the column selection condition, operating on the row graph of the schema sheaf of the input.

4) The union operator. For the FDL configuration, the table of the result is the same as for the relational operator. The row graph is the reflexive, transitive reduction of the union of the row graphs of the input posets, where the union of two graphs is the graph formed by the union of the node sets of the two graphs and the union of the link sets of the two graphs.

For the sheaf configuration, the table and the row graph of the result is the same as the FDL configuration. The column graph of the result is the same as either of the column graphs of the two inputs, which must both have the same column graph.

5) The intersection operator. For the FDL configuration, the table of the result is the same as for the relational operator. The row graph is the reflexive, transitive reduction of the intersection of the row graphs of the inputs, where the intersection of two graphs is the graph formed by the intersection of the node sets of the two graphs and the intersection of the link sets of the two graphs.

For the sheaf configuration, the table and the row graph of the result is the same as the FDL configuration. The column graph of the result is the same as the column graph of either of the inputs, which must both have the same column graph.

6) The rename operator. For both the FDL configuration and the sheaf configuration, the rename operator is the same as in the relational model.

In summary, the sheaf data model provides a formal, mathematical data model and explicitly incorporates inclusion. The algebra associated with the model contains relational, poset, lattice, and sheaf operators which provide the basis for a complete data definition and manipulation language.

The sheaf structure and its operators form an extremely useful abstraction. However, the sheaf structure suffers from a severe practical problem. In more detail, the source of a sheaf is the finite distributive lattice (FDL) containing "all possible distinct combinations" of members of a client-defined poset. The problem is even for very small posets, the number of "all possible distinct combinations" of rows is astronomical. It is completely infeasible to generate and store the entire source lattice. For the same reason, it is infeasible to store the target of the sheaf (i.e., the family of product sets).

The present invention solves this problem by combining data structures and algorithms to utilize the sheaf concepts without actually generating the entire source and target. This combination is referred to as the finite sheaf data type. In order to understand this data type, a few facts about FDLs will now be introduced.

As discussed above, an FDL contains the members of the original poset and all distinct combinations thereof. The members of the original poset are referred to as the join-irreducible members or "jims" of the lattice, while the "distinct combinations" are "join reducible members" or "jrms" (pronounced "germs").

Based on a Birkhoff representation theorem, a jrm is equal to the join of the collection of jims contained in its down set (this collection of jims is the "distinct combination" associated with the jrm.)

From the usual mathematical point of view, an FDL is a given, pre-existing base set and ordering relation (i.e., a fully instantiated table and graph). Every member of the lattice is represented by a row and a node in the graph; every inclusion relationship is represented by a path in the graph. From this point of view, the Birkhoff representation theorem is a statement about a relationship that must exist between the nodes and links of the graph. The Join and Meet operators are queries that find the proper member using the (fully instantiated) graph.

The fundamental mechanism making it practical to use the sheaf formalism is a form of deferred computation or "lazy evaluation." Instead of mimicking the mathematics and instantiating the entire lattice, the present invention instantiates the jims and only the jrms the user specifically requests. This approach reduces the storage requirements to feasible levels, but forces extension and reinterpretation of the mathematics.

Turning now to a finite sheaf data type, the finite sheaf data type (henceforth "finite sheaf" or just "sheaf") includes a data structure and a collection of operators on the data structure that implement the lazy evaluation strategy described above.

The data structure includes the following components and interpretations:

1) schema: a reference to another instance of a finite sheaf data type;
2) table: a collection of records. Table and record types are widely used in computer science and can be represented in a variety of ways, any of these well known methods are suitable. There must be a one-to-one correspondence between rows in the schema and columns in the table; and
3) row graph: a directed acyclic graph. The directed acyclic graph ("DAG") is also a well known data structure with a variety of representations, any of which are acceptable. There must be a node in the graph for each row in the table, but the graph in general will contain additional nodes, not associated with a specific row in the table.

The interpretation of this data structure is that the table represents the top table of the sheaf defined by the schema. Each row in the table represents a jim in the row lattice of the top table. The row graph represents the order relation for the row lattice. Nodes in the graph which correspond to rows in the table represent jims in the lattice, while the remaining nodes represent jrms. The links in the graph represent the "next most inclusive" relation (also known as the cover relation in mathematical lattice theory). The collection of jims associated with each jrm by the Birkhoff theorem is generated by traversing the graph below the jrm.

In the usual mathematical formulation of an FDL, each member is unique. But in practical computing applications, a user may want to have multiple copies of a lattice member. The data structure supports this by having the graph represent a lexicographic ordering relation. A lexicographic ordering relation is a generalization of the order words appear in a dictionary. Words are first ordered by their first letter. All words with the same first letter are then ordered by their second letter, etc. The first "letter" in the finite sheaf order is derived from the Birkhoff theorem. Member $1_1$ is less than the member $1_2$ if the set of jims in the down set of $1_1$ is a subset of the set of jims in the down set of $1_2$. The second "letter" is the order the members were created in. Lattice members which are copies have the same set of jims in their down set, the same first "letter", and are ordered relative to each other by the second "letter", in the order they were created in.

The table and graph combination stores all the jims of the row lattice, but only those jrms that the user specifically creates.

The finite sheaf data type supports all the relational, poset, lattice, and sheaf operators of the sheaf data model, as described above. In addition, the finite sheaf data type extends and reinterprets the mathematics as follows:

First, the set of operators must be extended to include operations for creating the jims and the order relation:

CREATE_JIM: creates a jim as a row in the table and corresponding node in the graph.

DELETE_JIM (JIM_ID): deletes the row and node corresponding to the jim with identifier jim_id.

CREATE_LINK (LESSER_ID, GREATER_ID): creates a link in the graph between the jims identified by lesser_id and greater_id.

DELETE_LINK (LESSER_ID, GREATER_ID): deletes the link between the jims identified by lesser_id and greater_id.

Second, the join and meet operators must be reinterpreted. Mathematically the result of these operations is guaranteed to exist, and hence these are query operations. They find the proper member using the order relation (i.e., row graph.) But if only previously requested jrms have been instantiated, then the result of a meet or join may not exist. The result has to be created and linked into the graph. In other words, instead of deriving the result from the order relation, the order relation must be derived from the result. Efficient algorithms for computing the join and meet are described in appendix A, which is incorporated in its entirety.

Problems of practical interest require the table and graphs associated with the finite sheaf type to be stored on disk, outside of the main memory of the computer. Efficient access to such externally stored data must take into account the properties and performance characteristics of disk storage. This problem has been extensively studied in the context of relational data base management technology.

The standard solution relies on constructing hierarchical index structures which allow retrieval of any record with a minimum number of disk accesses. The best known index structures are the B-tree and its variants. Nodes in the B-tree correspond to hierarchical groupings of records in the table.

The key to efficient indexing of the finite sheaf is the following observation: the hierarchical groupings of the B-tree are jrms in the row lattice. They are jrms chosen specifically to optimize disk access. Hence, the row graph itself can be used as an index. In addition to the jrms explicitly constructed by the user, internal routines of the finite sheaf type can construct jrms intended purely for use in achieving efficient disk access.

Turning now to applications which may use the sheaf data model. The mathematical study of spatial structure is organized into two broad disciplines. Topology is the study of continuity, nearness, and connectivity without regard to explicit shape and size. Geometry adds shape, size and measure to topology. The theory of topology can be formulated entirely in terms of lattice theory. Furthermore, recent research in computational geometry has established that all existing methods of geometry representation can be described using finite distributive lattices. The sheaf data model provides a direct realization of this mathematical structure and hence is ideal for storing and manipulating spatial data.

There is however, an additional operator, not described above, that is particularly convenient for creating instances of the finite sheaf type representing spatial data. Spatial data often appears in the form of a mesh, a large number of interconnected geometric primitives, all the same type, or of related types. As a simple example, the shape of a product may be specified in a CAD/CAM system by a triangle mesh—a large number of triangles connected together at their edges so as to cover the surface of the product. Such meshes are even more common when spatial data is used in the context of a simulation.

Mesh data is usually presented by specifying the number and type of the geometric primitive and by specifying the so-called "connectivity" data. The connectivity data describes how the primitives are to be connected, typically by listing the vertices that appear in each primitive. So a triangle mesh could be specified by stating the number of triangles, then specifying 3 vertex identifiers for each triangle. Two triangles are implicitly connected at a point if they both contain the same vertex, and connected at an edge if they share two vertices.

The additional operator is the cellular lattice constructor that makes it convenient and efficient to build the table and graph of the lattice corresponding to a mesh, given the usual input data. An algorithm for an efficient cellular lattice constructor is given in Appendix B, which is incorporated in its entirety.

Recent research in computer science has demonstrated the inheritance relationships between classes in an object-oriented application generate a mathematical lattice. The sheaf data model is thus able to directly and precisely represent inheritance relationships.

Object containment relationships can be divided into two categories: cyclic and acyclic relationships. In a cyclic relationship A contains B contains C contains . . . contains A. In other words, the chain of relationships eventually forms a circle. In an acyclic relationship, the chain is linear. The sheaf data model, as stated, represents only acyclic containment relationships.

As discussed above, simulation results typically represent the dependence of some property on space and time. In mathematical physics, such space and time dependent properties are called fields. The abstract fields of mathematical physics can be represented by sheaves. An important part of the present invention described here is the method by which the concrete field data of numerical simulation can be interpreted as a sheaf.

Figure 7:
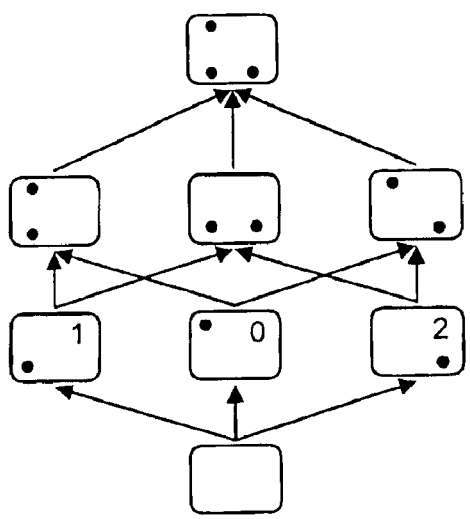
FIG. 7 illustrates an example of a discretization lattice for the triangle shown in FIG. 3.
Figure 8:
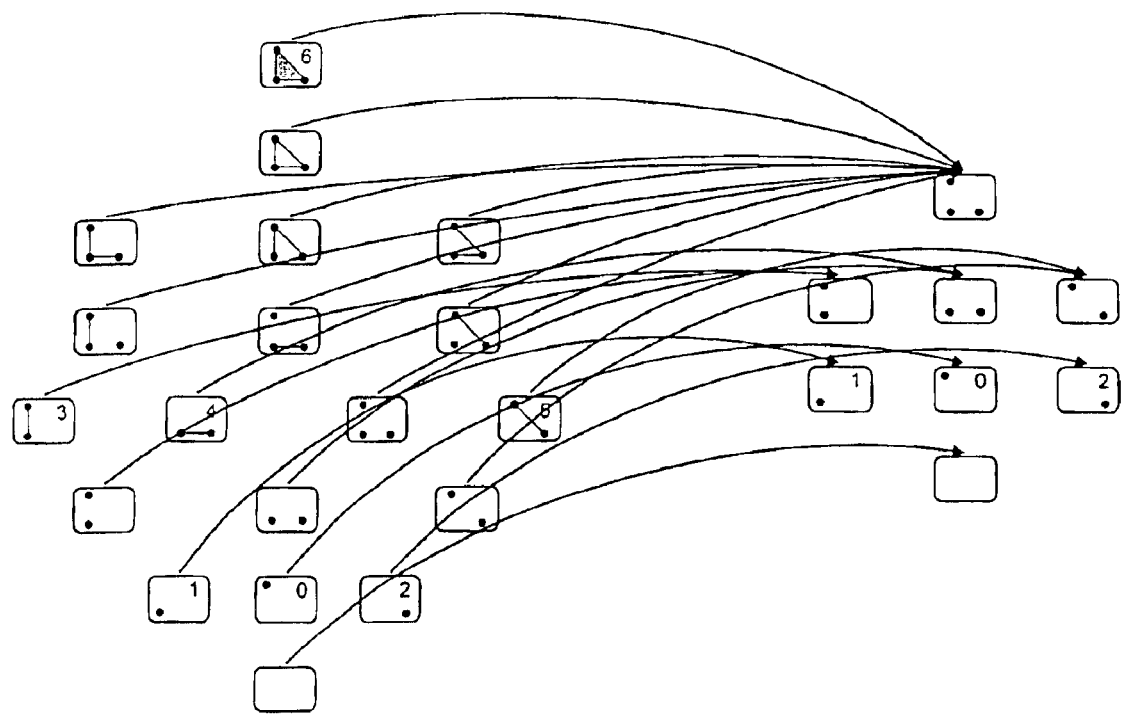
FIG. 8 illustrates a discretization map for the discretization lattice shown in FIG. 7.
Figure 9:
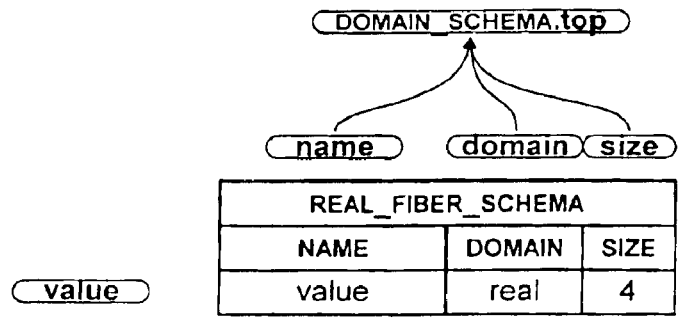
FIG. 9 illustrates a fiber space schema for the field example.

A field is a map that associates a value of some property, called the fiber space, with every point in some object, called the base space. Both the fiber space and the base space can be represented as finite sheaves. The representation of an abstract field as a finite sheaf requires the following information be provided:

1) Base space sheaf (FIGS. 3 and 4*c*);
2) Fiber space schema sheaf (FIG. 9);
3) Discretization map (FIG. 8): a map that associates each member of the base space lattice with a member of an arbitrary finite sheaf called the discretization (FIG. 7) of the base space. The image of a member of the base space lattice under the discretization map is also called the discretization of the member. Typically the discretization is generated from the base space lattice itself. For instance the jims of the discretization are chosen to be the set of all the vertices in a mesh and the discretization jrm associated with a base space jrm is the subset of vertices contained in the down set of the base space jrm (FIG. 8);
4) Evaluation subposet (FIG. 8, triangle 6): a subset of the base space lattice. This subset must be chosen so that it covers the base space, for instance the set of all triangles in a triangle mesh. Every member of the evaluation subposet is assumed to carry a local coordinate system; and
5) Evaluation method: a rule that can be used to compute the value of the field given the local coordinates of a point in a member of the evaluation subposet and the degrees of freedom (defined below) associated with that member. For example, the evaluation method associated with FIG. 8, triangle 6 is called linear interpolation.

Figure 10:
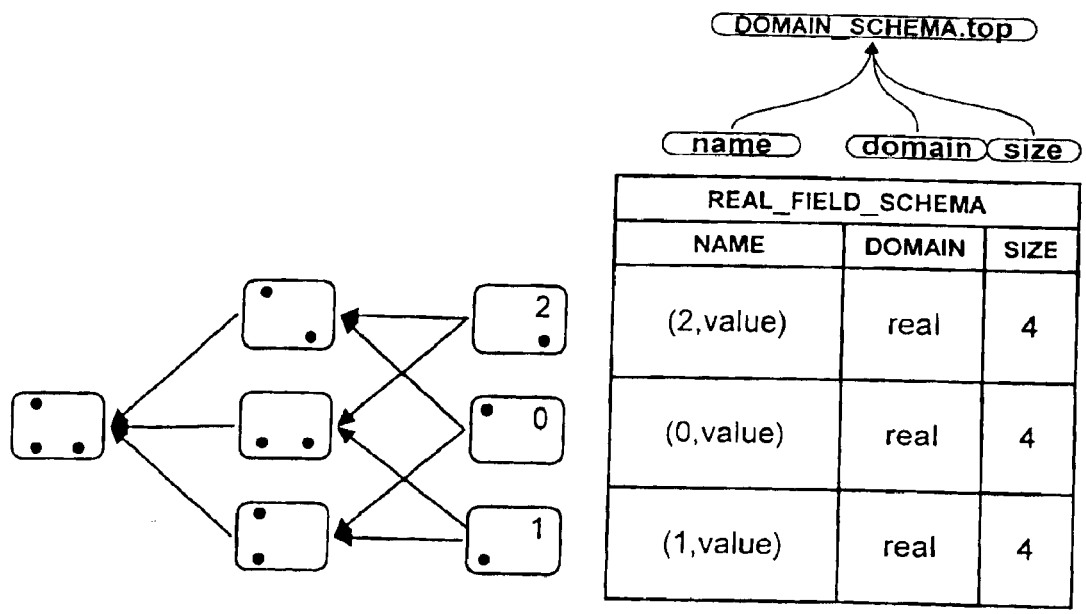
FIG. 10 illustrates that a schema for the field is the tensor product of the fiber schema and the discretization.
Figure 11:
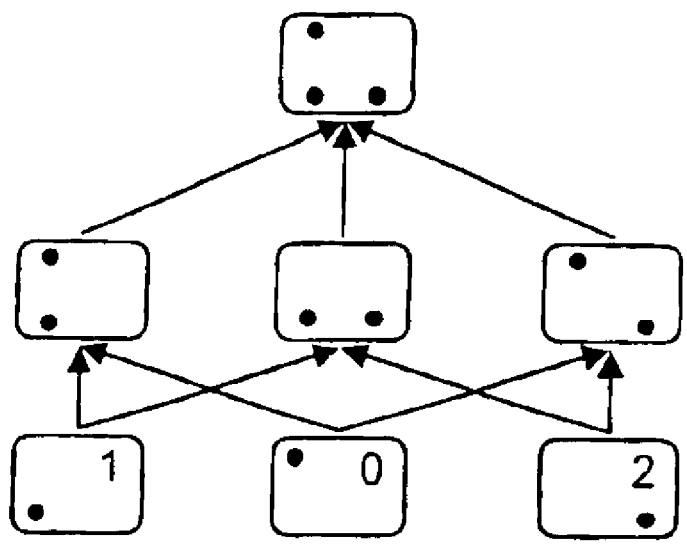
FIG. 11 illustrates a finite sheaf for a real field on triangle.

The schema (FIG. 10) for the sheaf of fields (FIG. 11) with a given base space and fiber space is the tensor product lattice of the discretization and the fiber space schema. The jims of the tensor product lattice are all pairs of the form (d, f) where d is a jim of the discretization and f is a jim of the fiber space schema. As with any finite sheaf, there is a column in the table of the sheaf for each jim in its schema. The domain of the column associated with schema jim (d, f) is defined to be the domain of f; the domain of d is ignored. A field is represented by a row in the table and the data in the cells of the row is referred to as the degrees of freedom of the field. The degrees of freedom associated with any pair (b, f), where b is a member of the base space lattice and f is a member of the fiber schema, is the restriction of the row to the schema member (d(b), f), where d(b) is the discretization of b.

Any numerical representation of a field can be interpreted as a sheaf using the above method. The ability of the sheaf data model to directly represent arbitrary fields, in addition to traditional relational data, spatial data, and object-oriented data, makes it an ideal model for scientific data.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous modifications and variations of the present invention are possible in light of the above teachings. It is therefore to be understood that within the scope of the appended claims, the invention may be practiced otherwise than as specifically described herein.

Appendices
Appendix A Join and Meet Algorithms
A.1 Bottom-Up Join Algorithm

By definition, the result of the join operation is a jrm. A jrm is defined by the intersection of its down set with the set of jims J. In our case, a jrm g is presented as the join of the members of a client specified subposet S. The jrm g is then defined by intersection of the down set of S with the set of jims J.

Since the construction "intersection of the down set of x with J" occurs frequently in the following, it is useful to define a notation for this set:

$$J(x) = down(x) \cap J$$

where x is either a member p of the lattice or a subset S of the lattice

In order to place g in the existing cover relation graph, we need to find the maximal lower bound and minimal upper bound for g in the existing graph. The maximal lower bound is the set of maximal members that are less than or equal to g while the minimal upper bound is the set of minimal members that are greater than or equal to g. If g is already in the graph, the maximal lower bound will contain a single member, the greatest lower bound, which must be equal to g.

Similarly, the minimal upper bound will contain a single member, the least upper bound, which also must be equal to g. If g is not in the graph, the maximal lower bound is the lower cover for g and the minimal upper bound is the upper cover for g.

Let S be a subset of the members of a lattice L. The bottom-up algorithm for computing g=join(S) is:

1. compute J(S)
2. compute the maximal lower bound of g from J(S)
3. compute the minimal upper bound of g from the minimal lower bound.
4. if g is not already in the graph, insert it between the minimal upper bound and the maximal lower bound J(S) is computed by a straight forward traversal of the down set of S. A bottom-up algorithm for computing the maximal lower bound and an algorithm for computing the minimal upper bound follow.

A.1.1 Compute the maximal lower bound:

The maximal lower bound is the set of maximal members of the down set of g. Thus to place g in the cover relation, we must compute the maximal members of the down set of g. This is the inverse of the usual definition of the down set, where we are given g and the cover relation and can find down-g by transitivity of the cover relation. Here, we are given only down-g∩J and must find all other members g' such that down-g'∩J is included in down-g∩J.

For notational convenience define J(g)=down-g∩J. Then in this notation, g'<=g iff J(g') is included in J(g).

The algorithm below depends on two lemmas:

Lemma 1:

J(g') is included in J(g) iff:

For g' a jrm, for all g" in the lower cover of g', J(g") is included in J(g).

For g' a jim, g' is a member of J(g)

Proof:

Part (a):

down-g'={g'}∩down-g1"∩ . . . ∩down-gn"

$J(g')=J(\{g'\}) \cap J(g1") \cap \ldots \cap J(gn")=J(g1") \cap \ldots \cap J(gn")$ since $J(\{g'\})=0$ if g'a jrm.

<J(g)Iff each J(gi")<J(g)

Part (b):

This is just a restatement of the definition of g, i.e. the Birkhoff representation theorem.

Lemma 2:

For every member g' of down-g, there is a chain j<: p1<: p2<: . . . <: pn<: g', for all minimal members j of down-g, where "<:" is the cover relation.

Proof:

By definition j<=g' since g' is a member of down-g and j is a minimal member. The chain condition is just a statement of the fact that the order relation <= is the reflexive transitive closure of <:.

The client defines the jrm g by specifying a "join expansion", i.e. some subposet s. Then J(g) is defined to be the set of jims contained in a depth first traversal of the stored cover relation, starting at s. That is, J(g) is derived from the existing cover relation.

We maintain two subposets, gdown for the down set of g and gdown_max for the maximal members of the down set. Both are initialized to contain J(g). We then repeatedly "reduce" gdown_max, as follows:

Let gdown_max_up be the upper cover of gdown_max, i.e. the union of the upper covers of the members of gdown_max. Let g' be a member of gdown_max_up. If g' is a jrm and the lower cover of g' is included in gdown, then J(g') is included in J(g) (Lemma 1) and hence g'<g so we insert g' into gdown. If g' is a jim, g'<g iff it is already in gdown. In either case, g' is larger than any member of its lower cover and it should replace any members of its lower cover in gdown_max. So we remove any members of g'.lower_cover and insert g' in gdown_max. We continue until we can not reduce gdown_max any further, either because it has only a single member or because gdown_max_up contains no members with lower covers contained entirely in gdown.

At each step of the above process we have that gdown contains only members of the down set of g and at each step, the set of maximal members is reduced by replacing some members in it with larger members. The process does not complete until all the members of gdown_max are maximal. Further more, all members of down-g are reachable by this process (Lemma 2). So when the reduction completes, it contains the all maximal members of down-g that are present in the graph. If gdown_max contains a single member, it is g itself, otherwise gdown_max is the lower cover of g.

A. 1.2 Compute the Minimal Upper Bound:

The algorithm for the minimal upper bound (mub) depends on the following lemma:

Lemma 3:

Define the minimal upper bound for any subposet S as:

$$mub(S):=\min(\text{intersection}(\text{up-}s, \text{ for all } s \text{ member of } S))$$

Then join(S)<=mub(S)

Proof:

For each s, up-s is the set of all p such that s<=p. Then intersection(up-s) is the set of all p such that every s in S is <=p. But then join(S)<=p for all p (see Davey and Priestley Lemma 2.9.iii) and hence join(S)<=min(intersection(up-s)).

If join(S)<mub(S), then mub(S) is the upper cover of join(S), otherwise, obviously, join(S)=mub(S). Unfortunately, there is no simple condition that distinguishs the two cases. In particular, size of mub(S)=1 is a necessary condition for equality, but it is not a sufficient condition. The necessary and sufficient condition is that the lower cover of join(S)=lower cover of mub(S).

We can compute mub(s) as follows:

Let s1, s2, . . . sn denote the members of S. Define two cover sets C0 and C1. Initialize C0 to up-s0. Then:

```
for i= 2,n
{
    c1 = up-si
    c0 = c0 intersection c1
}
``` c0=min(c0)

now c0 contains either the join or it's upper cover

A.2 Top-Down Join Algorithm

As above, let S be a subset of a lattice L, let g=join(S), and let M=mub(g).

The maximal lower bound (m1b) of g is contained in the lower cover of M. In fact, we have $$mlb(g)=\{p | p \epsilon M.\text{lower\_cover} \text{ and } J(p) \subset J(g)\}$$

Now the condition $J(p) \subset J(g)$ will be satisfied if and only if the condition $J(p') \subset J(g)$ for all p' $\epsilon$ p.lower_cover. In other words, the condition is recursive.

We can compute J(S) and mub(g) as above. Then we can compute m1b(g) top down as follows:

Initialize Q=M.lower_cover

For each member q of Q:

perform a depth first traversal of down(q). In a depth first traversal, there are three possible actions associated with each node in the graph: the previsit action, the ink action, and the postvisit action. Let p be the current node in the graph. Assume that each node p has a boolean variable is contained that is true if $J(p) \subset J(g)$.

In the previsit action:

```
if p is ajim, set p.is_contained = J(g).contains_member(p)
else set p.is_contained = true
```

In the link action:

```
set p.is_contained = p.is_contained AND p'.is_contained
``` where p' is the node at the lesser end of the link.

When the traversal completes, if not q.is_contained, remove q from Q.

end for

Q now contains only those members m of M.lower_cover such $J(m) \subset J(g)$ and hence: mlb(g)=Q.

As above, if g is not already in the graph, insert it between the minimal upper bound and the maximal lower bound.

A.3 Meet Algorithm

Birkhoff representation theorem states that any jrm is equal to the join of the jims contained in it. Let S={$1_0$, $1_1$, . . . $1_n$} be a subset of a lattice L. Then the jims of c=meet(S) are given by:

$$J(c) = \cap_{1 \epsilon S} J(s) = J(1_0) \cap J(1_1) \cap Y J(1_n)$$

so we have:

$$c = meet(S) = join(J(1_0) \cap J(1_1) \cap \ldots J(1_n))$$

The meet operation thus reduces to a combination of set intersection operations and a join operation. The set intersection operation is standard, the join algorithms are given above.

Appendix B Cellular Lattice Constructor Algorithm

A cellular lattice is constructed by making copies of a template and gluing the copies together. The copies are glued together by specifying which members in one copy are the same as members in another copy. The members which are thus glued together are the atoms of the template, the members of the template which form the upper cover of the bottom member.

The input to the cellular lattice constructor consists of:

template: any lattice copy_ct: the number of copies to be made of the template glue_ids: an array of arbitrary identifiers. The number of entries in this array must be equal to the number of atoms in the template times copy_ct The algorithm requires 3 auxiliary data structures:

glue_map: a map from the externally defined glue_id to the id of a member in the result template_map: a map from template member ids to result member ids.

lower_cover_stack: a stack containing lower cover sets

The top level of the algorithm is:

1. initialize glue_map to empty
2. create a top member for the result
3. for i=0 to copy_ct:
   initialize template_map to empty.
   perform a depth first traversal of the template.
4. compute the minimal upper bound of the top of the result, as in A.1.2 above.
5. if the top of the result is not already in the graph, insert it below the minimal upper bound.

The actions performed in the traversal are:

previsit action:

if the template member is not an atom, create an empty lower cover set for the copy of the template member and push it onto lower_cover_stack link action:
  get the result member corresponding to the template member at the lesser end of the link using template_map. This look up will always succeed because the depth first traversal ensures that the postvisit action of the lesser member will always occur before the member appears as the lesser member in a link.
  insert the result member in the cover set that is on the top of lower_cover_stack
postvisit action:
  if the current template member is a atom:
    set glue_id equal to the next entry from glue ids and increment the glue_ids counter
    look up glue_id in the glue_map. If an entry exists, glue_id has been used before, get the result id associated with it by the map. Otherwise, the glue_id as not been used before, create a new result member and insert the (glue_id, result id) pair in the map.
    insert the (current template id, result id) in template_map
  if the current template member is not an atom:
    Check to see if any members already in the block have a lower cover identical to what is currently on the top of lower_cover_stack. If there are any such members, they must be in the upper cover of every member of the cover on the stack, hence they must be in the upper cover of the first member. Check the lower cover of every member of the upper cover of the first member of the cover on the stack.
    If a member with an identical lower cover already exists, it is the copy of the current template member. Otherwise, create a new result member and link it to the members of the top of lower_cover_stack
    insert the (current template id, result id) in template_map
    pop lower_cover_stack
  if the current template member is the top of the template, insert result id into the lower cover of the top of the result

What is claimed as new and is desired to be secured by Letters Patent of the United States is:

1. A computer-implemented method of representing data on a computer as a collection of finite distributive lattices for facilitating information retrieval in response to a query, comprising the steps of:
   selecting one or more entity types within an application, each entity type being a single entity type;
   constructing a distinct table to represent each entity type selected in said selecting step, such that there is a one-to-one correspondence between respective tables and entity types;
   for each table executing steps of
   constructing a column in the table for a respective attribute of the entity type, such that there is a one-to-one correspondence between columns and attributes of the entity type;
   constructing a row in the table for each entity of the entity type, such that there is a one-to-one correspondence between rows and entities;
   entering attribute data into rows of the table;
   specifying a row graph which represents an externally specified ordering relationship between the rows of the table; and
   defining a finite distributive lattice (FDL) from the row graph to have a member for each row and each distinct combination of the rows of the table,
   wherein two combinations of rows are distinct if they do not represent a same ordering relationship.

2. The method according to claim 1, wherein the table includes one row for each primary entity of the entity type.

3. The method according to claim 1, wherein a first entity is included in a second entity if and only if there is a path in the graph from a node corresponding to the first entity to a node corresponding to the second entity.

4. The method according to claim 1, wherein the ordering relationship of the rows of the table comprises a partially ordered relationship.

5. The method according to claim 1, further comprising the step of:
   querying the row graph to determine distinct combinations of the rows of the table,
   wherein two different combinations of members are distinct if they do not represent a same ordering relationship.

6. The method according to claim 1, further comprising the step of:
   executing a command indicative of an operation $a_1 \leq a_2$ to determine if and only if there is a path in the graph from $a_1$ to $a_2$, where $a_1$ and $a_2$ are nodes in the row graph.

7. The method according to claim 1, further comprising the step of:
   executing a command indicative of an operation DOWN (a) in which a resultant table and graph is returned including all rows of the table and nodes and links of the row graph which are less than or equal to "a", where "a" is a specified node in the row graph.

8. The method according to claim 1, wherein the attribute data comprises at least one of simulation data, spatial data, object-orientated data, and relational data.

9. The method according to claim 1, further comprising the step of:
   executing a command indicative of an operation JOIN($1_1, 1_2, \ldots 1_n$) to determine a smallest member of the FDL which is greater than or equal to the inputs $1_1, 1_2, \ldots 1_n$.

10. The method according to claim 1, further comprising the step of:
    executing a command indicative of an operation MEET ($1_1, 1_2, \ldots 1_n$) to determine a largest member of the FDL which is less than or equal to the inputs $1_1, 1_2, \ldots 1_n$.

11. The method according to claim 1, wherein any node in the row graph below and connected to another node is included in the other node.

12. The method according to claim 1, further comprising the step of:
    executing a command indicative of the operation n-ary Cartesian product L1×L2× . . . ×Ln, to generate a resultant FDL with columns equal to the disjoint union of the columns of L1, L2, . . . Ln, where L1, L2, . . . Ln represents any collection of FDLs,
    wherein the row-graph is any partial order.

13. The method according to claim 1, further comprising the step of:
    executing a command indicative of the operation of SELECTION(L, c) to generate a resultant FDL comprising the table rows that satisfy c, the row graph that satisfy c, and all columns of L, where L is a FDL and c is a condition on the rows of L.

14. The method according to claim 1, further comprising the step of:
    executing a command indicative of the operation PROJECTION(L, c) to generate a resultant FDL comprising all columns of L that satisfy c, and all table rows and the entire graph of L, where L is a FDL and c is a condition on the columns of L.

15. The method according to claim 1, further comprising the step of:
executing a command indicative of the operation UNION (L1, L2) to generate a resultant FDL containing the rows of L1 and the rows of L2, a row graph which is the reflexive, transitive reduction of the union of the row graphs of L1 and L2, and the columns of L1, where L1 and L2 are FDLs with the same columns.

16. The method according to claim 1, further comprising the step of:
executing a command indicative of the operation INTERSECTION(L1, L2) to generate a resultant FDL containing those rows of L1 which are the same as rows in L2, a row graph which is the reflexive, transitive reduction of the intersection of the row graphs of L1 and L2, and the columns of L1, where L1 and L2 are FDLs with the same columns.

17. The method according to claim 1, further comprising the step of:
executing a command indicative of RENAME(L, $new_{13}$ name) to change the name of L to $new_{13}$ name, where L is a FDL and $new_{13}$ name is a name.

18. The method according to claim 1, further comprising the step of:
executing a command indicative of the operator CREATE_JIM(L) to create a new row in the table of L and a new node in the row graph of L, where L is a FDL.

19. The method according to claim 1, further comprising the step of:
executing a command indicative of DELETE_JIM(L, JIM_ID) to remove a row from the table of L and to remove the corresponding node and any connecting links in the row graph of L, where L is a FDL and JIM_ID identifies a row in L.

20. The method according to claim 1, further comprising the step of:
executing a command indicative of the operator CREATE_LINK(L, LESSER_ID, GREATER_ID) to create a link between the node corresponding to LESSER_ID and the node corresponding to GREATER_ID in the row graph of L, where L is a FDL and LESSER_ID and GREATER_ID identify the lesser and greater rows, respectively, of the ordering relationship represented by the link.

21. The method according to claim 1, further comprising the step of:
executing a command indicative of the operator DELETE_LINK(L, LESSER_ID, GREATER_ID) to remove a link between the node corresponding to LESSER_ID and the node corresponding to GREATER_ID in the row graph of L, where L is a FDL and LESSER_ID and GREATER_ID identify the lesser and greater rows, respectively, of the ordering relationship represented by the link.

22. A computer implemented data model for facilitating information retrieval via a query, comprising:
a first table and other tables respectively configured to represent a single entity type from a group of entity types such that there is a one-to-one correspondence between respective tables and entity types, said first table having
a column for a respective attribute of the entity type such that there is a one-to-one correspondence between columns and respective attributes of the entity type, and
a different row for each entity of the entity types such that there is a one-to-one correspondence between rows and respective entities, wherein each row is externally specified and includes attribute data for an entity that corresponds with the row;
a row graph which represents an ordering relationship between the rows of the first table; and
a finite distributive lattice (FDL) defined from the first table to have distinct combinations of the rows of the first table, wherein two different combinations of members are distinct if they do not represent a same ordering relationship.

23. The data model according to claim 22, wherein the first table includes one row for each primary entity of the entity type.

24. The data model according to claim 22, wherein a first entity is included in a second entity if and only if there is a path in the graph from a node corresponding to the first entity to a node corresponding to the second entity.

25. The data model according to claim 22, wherein the ordering relationship of the rows of the first table comprises a partially ordered relationship.

26. The data model according to claim 22, wherein distinct combination of the rows of the first table are determined by querying the row graph, and
wherein two different combinations of members are distinct if they do not represent a same ordering relationship.

27. The data model according to claim 22, further comprising:
a command indicative of an operation $a_1 \leq a_2$ to determine if and only if there is a path in the graph from $a_1$ to $a_2$, where $a_1$ and $a_2$ are nodes in the row graph.

28. The data model according to claim 22, further comprising:
a command indicative of an operation DOWN(a) in which a resultant table and graph is returned including all rows of the first table and nodes and links of the row graph which are less than or equal to "a", where "a" is a specified node in the row graph.

29. The data model according to claim 22, wherein the attribute data comprises at least one of simulation data, spatial data, object-orientated data, and relational data.

30. The data model according to claim 22, further comprising:
a command indicative of an operation $JOIN(1_1, 1_2, \ldots 1_n)$ to determine a smallest member of the FDL which is greater than or equal to the inputs $1_1, 1_2, \ldots 1_n$.

31. The data model according to claim 22, further comprising:
a command indicative of an operation $MEET(1_1, 1_2, \ldots 1_n)$ to determine a largest member of the FDL which is less than or equal to the inputs $1_1, 1_2, \ldots 1_n$.

32. The data model according to claim 22, wherein any node in the row graph below and connected to another node is included in the other node.

33. The data model according to claim 22, further comprising:
a command indicative of the operation n-ary Cartesian product L1×L2× . . . ×Ln, to generate a resultant FDL with columns equal to the disjoint union of the columns of L1, L2, . . . Ln, where L1, L2, Ln represents any collection of FDLs,
wherein the row-graph is any partial order.

34. The data model according to claim 22, further comprising:
a command indicative of the operation of SELECTION (L, c) to generate a resultant FDL comprising the table rows of L that satisfy c, the row graph that satisfy c, and all columns of L, where L is a FDL and c is a condition on the rows of L.

35. The data model according to claim 22, further comprising:
a command indicative of the operation PROJECTION(L, c) to generate a resultant FDL comprising all columns of L that satisfy c, and all table rows and the entire graph of L, where L is a FDL and c is a condition on the columns of L.

36. The data model according to claim 22, further comprising:
a command indicative of the operation UNION(L1, L2) to generate a resultant FDL containing the rows of L1 and the rows of L2, a row graph which is the reflexive, transitive reduction of the union of the row graphs if L1 and L2, and columns of L1, where L1 and L2 are FDLs with the same columns.

37. The data model according to claim 22, further comprising:
a command indicative of the operation INTERSECTION (L1, L2) to generate a resultant FDL containing those rows of L1 which are the same as rows in L2, a row graph which is the reflexive, transitive reduction of the intersection of the row graphs of L1 and L2, and the columns of L1, where L1 and L2 are FDLs with the same columns.

38. The data model according to claim 22, further comprising:
a command indicative of RENAME(L, new_name) to change the name of L to new_name, where L is a FDL and new_name is a name.

39. The data model according to claim 22, further comprising:
a command indicative of the operator CREATE_JIM(L) to create a new row in the table of L and a new node in the row graph of L, where L is a FDL.

40. The data model according to claim 22, further comprising:
a command indicative of DELETE_JIM(L, JIM_ID) to remove a row from the table of L and to remove the corresponding node and any connecting links in the row graph of L, where L is a FDL and JIM_ID identifies a row in L.

41. The data model according to claim 22, further comprising:
a command indicative of the operator CREATE_LINK (L, LESSER_ID, GREATER_ID) to create a link between the node corresponding to LESSER_ID and the node corresponding to GREATER_ID in the row graph of L, where L is a FDL and LESSER_ID and GREATER_ID identify the lesser and greater rows, respectively, of the ordering relationship represented by the link.

42. The data model according to claim 22, further comprising:
a command indicative of the operator DELETE_LINK (L, LESSER_ID, GREATER_ID) to remove a link between the node corresponding to LESSER_ID and the node corresponding to GREATER_ID in the row graph of L, where L is a FDL and LESSER_ID and GREATER_ID identify the lesser and greater rows, respectively, of the ordering relationship represented by the link.

43. A computer-implemented method of representing data on a computer as a collection of finite sheaves for facilitating information retrieval in response to a query, comprising the steps of:
selecting one or more entity types within an application, each entity type being a single entity type;
constructing a distinct table to represent an entity type selected in said selecting step, such that there is a one-to-one correspondence between respective tables and entity types;
for each table executing steps of:
selecting another table, hereafter referred to as the schema table of the current table;
constructing a column in the current table for each row of the respective schema table, such that there is a one-to-one correspondence between columns in the current table and rows in the schema table;
interpreting each column of the table as an attribute of the associated entity type;
interpreting a row graph of the schema table as a column graph of the current table, said column graph representing an ordering relationship between the columns of the current table;
constructing a row in the current table for each entity of the associated entity type, such that there is a one-to-one correspondence between rows and entities;
entering attribute data into rows of the current table;
specifying a row graph which represents an externally specified ordering relationship between the rows of the current table;
defining a finite distributive lattice (FDL) from the row graph to have a member for each row and each distinct combination of the rows of the current table, wherein two combinations of rows are distinct if they do not represent a same ordering relationship; and
defining a finite sheaf from the table, row graph and column graph.

44. The method according to claim 43, wherein a first entity is included in a second entity if and only if there is a path in the graph from a node corresponding to the first entity to a node corresponding to the second entity.

45. The method according to claim 43, wherein the ordering relationship of the rows of the first table comprises a partially ordered relationship.

46. The method according to claim 43, further comprising the step of:
querying the row graph to determine distinct combinations of the rows of the first table,
wherein two different combinations of members are distinct if they do not represent a same ordering relationship.

47. The method according to claim 43, further comprising the step of:
executing a command indicative of an operation a1<a2 to determine if and only if there is a path in the graph from a1 to a2, where a1 and a2 are nodes in the row graph.

48. The method according to claim 43, further comprising the step of:
executing a command indicative of an operation DOWN (a) in which a resultant table and graph is returned including all rows of the first table and nodes and links of the row graph which are less than or equal to "a", where "a" is a specified node in the row graph.

49. The method according to claim 43, wherein the attribute data comprises at least one of simulation data, spatial data, object-orientated data, and relational data.

50. The method according to claim 43, further comprising the step of:
executing a command indicative of an operation JOIN(l1, l2, . . . ln) to determine a smallest member of the sheaf which is greater than or equal to the inputs l1, l2, . . . ln.

51. The method according to claim 43, further comprising the step of
executing a command indicative of an operation MEET (l1, l2, . . . ln) to determine a largest member of the sheaf which is less than or equal to the inputs l1, l2, . . . ln.

52. The method according to claim 43, further comprising the step of:
executing a command indicative of an operation EXP(L) to generate a resultant sheaf with a column graph corresponding to the row graph of L, where L is a sheaf.

53. The method according to claim 43, further comprising the step of:
executing a command indicative of an operation LOG(L) to determine the schema sheaf of L, where L is a sheaf.

54. The method according to claim 43, further comprising the step of:
executing a command indicative of an operation RESTRICT L TO S to determine a projection of the sheaf onto columns in the down set of S, where S is a member of the schema of L and L is a sheaf.

55. The method according to claim 43, wherein any node in the row graph below and connected to another node is included in the other node.

56. The method according to claim 43, further comprising the step of:
executing a command indicative of the operation n-ary Cartesian product L1×L2× . . . ×Ln, to generate a resultant sheaf with a schema sheaf equal to the union of the schema of L1, L2, . . . Ln, where L1, L2, . . . Ln represents any collection of sheaves.

57. The method according to claim 43, further comprising the step of:
executing a command indicative of the operation of SELECTION(L, c) to generate a resultant sheaf comprising the table rows that satisfy c, the row graph that satisfy c, and the entire column graph and all columns of L, where L is a sheaf and c is a condition on the rows of L.

58. The method according to claim 43, further comprising the step of:
executing a command indicative of the operation PROJECTION(L, c) to generate a resultant sheaf comprising the column graph and columns of L that satisfy c, and all table rows, and the entire row graph of L, where L is a sheaf and c is a condition on the columns of L.

59. The method according to claim 43, further comprising the step of:
executing a command indicative of the operation UNION (L1, L2) to generate a resultant sheaf containing the rows of L1 and the rows of L2, a row graph which is the reflexive, transitive reduction of the union of the row graphs of L2 and L2, and the column graph of L1, where L1 and L2 are sheaves with the same column graph.

60. The method according to claim 43, further comprising the step of:
executing a command indicative of the operation INTERSECTION(L1, L2) to generate a resultant sheaf containing those rows of L1 which are the same as rows in L2, a row graph which is the reflexive, transitive reduction of the intersection of the row graphs of L1 and L2, and the column graph of L1, where L1 and L2 are sheaves with the same column graph.

61. The method according to claim 43, further comprising the step of:
executing a command indicative of RENAME(L, new_name) to change the name of L to new_name, where L is a sheaf and new_name is a name.

62. The method according to claim 43, further comprising the step of:
executing a command indicative of the operator CREATE_JIM(L) to create a new row in the table of L and a new node in the row graph of L, where L is a sheaf.

63. The method according to claim 43, further comprising the step of:
executing a command indicative of DELETE_JIM(L, JIM_ID) to remove a row from the table of L and to remove the corresponding node and any connecting links in the row graph of L, where L is a sheaf and JIM_ID identifies a row in L.

64. The method according to claim 43, further comprising the step of:
executing a command indicative of the operator CREATE_LINK(L, LESSER_ID, GREATER_ID) to create a link between the node corresponding to LESSER_ID and the node corresponding to GREATER_ID in the row graph of L, where L is a sheaf and LESSER_ID and GREATER_ID identify the lesser and greater rows, respectively, of the ordering relationship represented by the link.

65. The method according to claim 43, further comprising the step of:
executing a command indicative of the operator DELETE_LINK(L, LESSER_ID, GREATER_ID) to remove a link between the node corresponding to LESSER_ID and the node corresponding to GREATER_ID in the row graph of L, where L is a sheaf and LESSER_ID and GREATER_ID identify the lesser and greater rows, respectively, of the ordering relationship represented by the link.

66. A data model encoded on a computer-readable medium as a collection of finite sheaves for facilitating information retrieval in response to a query, comprising:
a first table and other tables respectively configured to represent a single entity type from a group of entity types, such that there is a one-to-one correspondence between respective tables and entity types, said first table having:
an association with a second table, hereafter referred to as the schema table of the first table;
a column for each row of the respective schema table, such that there is a one-to-one correspondence between columns in the first table and rows in the schema table; each said column corresponding to an attribute of the entity type associated with the first table;
a column graph defined to be a row graph of the respective schema table, said column graph representing an ordering relationship between the columns of the current table;
a row for each entity of the associated entity type, such that there is a one-to-one correspondence between rows and entities;

attribute data included in the rows;
a row graph which represents an externally specified ordering relationship between the rows of the first table;
a finite distributive lattice (FDL) defined from the row graph to have a member for each row and each distinct combination of the rows of the first table, wherein two combinations of rows are distinct if they do not represent a same ordering relationship; and
a finite sheaf corresponding to the table, row graph and column graph.

67. The data model according to claim 66, wherein a first entity is included in a second entity if and only if there is a path in the graph from a node corresponding to the first entity to a node corresponding to the second entity.

68. The data model according to claim 66, wherein the ordering relationship of the rows of the first table comprises a partially ordered relationship.

69. The data model according to claim 66, wherein distinct combination of the rows of the first table are determined by querying the row graph, and
wherein two different combinations of members are distinct if they do not represent a same ordering relationship.

70. The data model according to claim 66, further comprising:
a command indicative of an operation a1<a2 to determine if and only if there is a path in the graph from a1 to a2, where a1 and a2 are nodes in the row graph.

71. The data model according to claim 66, further comprising:
a command indicative of an operation DOWN(a) in which a resultant table and graph is returned including all rows of the first table and nodes and links of the row graph which are less than or equal to "a", where "a" is a specified node in the row graph.

72. The data model according to claim 66, wherein the attribute data comprises at least one of simulation data, spatial data, object-orientated data, and relational data.

73. The data model according to claim 66, further comprising:
a command indicative of an operation JOIN(l1, l2, . . . ln) to determine a smallest member of the sheaf which is greater than or equal to the inputs l1, l2, . . . ln.

74. The data model according to claim 66, further comprising:
a command indicative of an operation MEET(l1, l2, . . . ln) to determine a largest member of the sheaf which is less than or equal to the inputs l1, l2, . . . ln.

75. The data model according to claim 66, further comprising:
a command indicative of an operation EXP(L) to generate a resultant sheaf with a column graph corresponding to the row graph of L, where L is a sheaf.

76. The data model according to claim 66, further comprising:
a command indicative of an operation LOG(L) to determine the schema sheaf of L, where L is a sheaf.

77. The data model according to claim 66, further comprising:
a command indicative of an operation RESTRICT L TO S to determine a projection of L onto columns in the down set of S, where S is a member of the schema of L and L is a sheaf.

78. The data model according to claim 66, wherein any node in the row graph below and connected to another node is included in the other node.

79. The data model according to claim 66, further comprising:
a command indicative of the operation n-ary Cartesian product L1×L2× . . . ×Ln, to generate a resultant sheaf with a schema sheaf equal to the union of the schema of L1, L2, . . . Ln, where L1, L2, . . . Ln represents any collection of sheaves.

80. The data model according to claim 66, further comprising:
a command indicative of the operation of SELECTION (L, c) to generate a resultant sheaf comprising the table rows that satisfy c, the row graph that satisfy c, and the entire column graph and all columns of L, where L is a sheaf and c is a condition on the rows of L.

81. The data model according to claim 66, further comprising:
a command indicative of the operation PROJECTION(L, c) to generate a resultant sheaf comprising the column graph and columns of L that satisfy c, and all table rows, and the entire row graph of L, where L is a sheaf and c is a condition on the columns of L.

82. The data model according to claim 66, further comprising:
a command indicative of the operation UNION(L1, L2) to generate a resultant sheaf containing the rows of L1 and the rows of L2, a row graph which is the reflexive, transitive reduction of the union of the row graphs of L1 and L2, where L1 and L2 are sheaves with the same column graph.

83. The data model according to claim 66, further comprising:
a command indicative of the operation INTERSECTION (L1, L2) to generate a resultant sheaf containing those rows of L1 which are the same as rows in L2, a row graph which is the reflexive, transitive reduction of the intersection of the row graphs of L1 and L2, and the column graph of L1, where L1 and L2 are sheaves with the same column graph.

84. The data model according to claim 66, further comprising:
a command indicative of RENAME(L, new_name) to change the name of L to new_name, where L is a sheaf and new_name is a name.

85. The data model according to claim 66, further comprising:
a command indicative of the operator CREATE_JIM(L) to create a new row in the table of L and a new node in the row graph of L, where L is a sheaf.

86. The data model according to claim 66, further comprising:
a command indicative of DELETE_JIM(L, JIM_ID) to remove a row from the table of L and to remove the corresponding node and any connecting links in the row graph of L, where L is a sheaf and JIM_ID identifies a row in L.

87. The data model according to claim 66, further comprising:
a command indicative of the operator CREATE_LINK (L, LESSER_ID, GREATER_ID) to create a link between the node corresponding to LESSER_ID and the node corresponding to GREATER_ID in the row graph of L, where L is a sheaf and LESSER_ID and GREATER_ID identify the lesser and greater rows, respectively, of the ordering relationship represented by the link.

88. The data model according to claim 66, further comprising:

a command indicative of the operator DELETE_LINK (L, LESSER_ID, GREATER_ID) to remove a link between the node corresponding to LESSER_ID and the node corresponding to GREATER_ID in the row graph of L, where L is a sheaf and LESSER_ID and GREATER_ID identify the lesser and greater rows, respectively, of the ordering relationship represented by the link.

* * * * *